US005829118A

United States Patent [19]

Gates

[11] Patent Number: 5,829,118

[45] Date of Patent: Nov. 3, 1998

[54] METHOD AND APPARATUS FOR SLOTLESS STATOR MANUFACTURING

[75] Inventor: Thomas E. Gates, Sandy Hook, Conn.

[73] Assignee: Kollmorgen Corporation, Waltham, Mass.

[21] Appl. No.: 613,540

[22] Filed: Mar. 11, 1996

[51] Int. Cl.[6] ..................... H02K 15/06

[52] U.S. Cl. ..................... 29/596; 29/736; 29/606; 264/272.2

[58] Field of Search ..................... 29/596, 598, 736, 29/605, 606; 264/272.2; 31/42, 154

[56] References Cited

U.S. PATENT DOCUMENTS

| | | | |
|---|---|---|---|
| 4,563,808 | 1/1986 | Lender | 29/596 |
| 4,571,822 | 2/1986 | Saito et al. | 29/596 |
| 4,648,176 | 3/1987 | Moser | 29/596 |
| 4,739,549 | 4/1988 | Rist | 29/736 |
| 4,970,774 | 11/1990 | Barrera | 29/596 |

*Primary Examiner*—W. Donald Bray
*Attorney, Agent, or Firm*—Morgan & Finnegan

[57] ABSTRACT

A method of producing a slotless wound stator for an electric machine wherein coils are pre-formed and located on the location pins of a transfer tool. The transfer tool with the winding coils thereon is then inserted into the stator shell. Coil guides comb the coils during insertion so that the active portions of the winding are relatively straight and parallel to the axis. When the winding is in place, the location pins are retracted and the transfer tool forces the end turns outward. When the end turns are flared outwardly, the transfer tool is removed.

9 Claims, 5 Drawing Sheets

26
14
24
24
23
22
22
11
18
20
12
16
15
10
17
19
21

METHOD AND APPARATUS FOR SLOTLESS STATOR MANUFACTURING

FIELD OF THE INVENTION

This invention relates to methods and apparatus for fabricating electric motors, and more particularly, to such methods and apparatus for fabricating slotless and toothless electric motors.

BACKGROUND OF THE INVENTION

High performance servo motors of a slotless design are described, for example, in U.S. Pat. Nos. 4,679,313; 4,868,970 and 4,954,739. A slotless stator winding design has many advantages over more conventional designs with slots and teeth. Slotless designs without teeth have no significant cogging and much reduced noise. They have low inductance and therefore are capable of high frequency excitation switching and very high speed operation. Slotless designs can have an improved power to weight ratio and a high operating efficiency. These designs have no teeth and therefore no tooth saturation problems. Further, the slotless designs generally have a reduced torque ripple and smoother operation.

Although slotless motor designs have many potential advantages, they have been difficult to realize in practice because of difficulties encountered in fabrication. Known fabrication techniques include U.S. Pat. No. 4,563,808 to Robert J. Lender. In the case of a conventional toothed stator construction, prewound coils are transferred, by means of a transfer tool, to a fixture in a placing machine that slides the coils into their proper position in the stator core. With the conventional design the teeth define the slot boundaries and are used by the placing machine to guide the coils into their proper position. The aforementioned Lender patent describes a unique fixturing which provides the placing machine with temporary teeth to guide the coils into position. The coils are held in place by an expandable sleeve at the center of the winding as the placing machine is removed.

In both the prior slotted and slotless designs the nature of the fixturing which slides the prewound coils into place tends to limit the amount of magnet wire that can be placed in a defined area. This is because the placing tools must usually share the slot area with the magnet wire. Slot-fills (ratio of copper crossectional area to total slot area) on the order of 30–40% were often the maximum achievable using double insulated magnet wire.

SUMMARY OF THE INVENTION

The invention provides a new method and apparatus for placing prewound coils in a slotless stator. The process and equipment is simpler than with most prior techniques. The coil conductors can be more accurately placed parallel to the motor axis and higher slot-fills can be achieved.

A transfer tool surrounded by a non-stick sleeve (e.g. Teflon coated) is of a generally telescoping structure and is used in accordance with the invention to transfer prewound coils into the cylindrical stator core. Retractable locator pins extend from one end of the tool and are used to loosely position prewound coils. Coil guides are used to comb the conductors as the tool with the loosely positioned coils is pushed through the stator core. When the coils are in position with the leading end turns on the locator pins extending beyond the stator core, the locator pins are retracted to release the leading end turns. A stripper ram is then pushed upwardly to flair the leading end turns outwardly. The transfer tool is then pulled trough leaving the coils and the non-stick sleeve behind in the stator core. The finishing operations, such as interconnecting the coil leads and impregnating the winding with a suitable resin, are then performed. The non-stick sleeve can then be removed from the center of the winding if desired.

Some of the advantages of the methods and apparatus according to the invention are:

(1) by using a combined tool for transfer and insertion, a step in the process is eliminated and the opportunity for placement error is reduced;

(2) by positioning the coils surrounding the nonstick sleeve which stays with the coils after placement in the stator core, coil conductor positioning error is further reduced and processing simplified;

(3) by using retractable locator pins extending axially rather than radially, a slot-fill on the order of 65%. can be achieved;

(4) the tool design is capable of making relatively small motors (as small as 1.25" diameter) and the production cycle time is reduced because operator functions are simplified; and (5) by interchanging transfer tools and a few other components, the apparatus can readily be changed to make motors with different winding patterns, number of poles or phases, and/or diameters and lengths.

BRIEF DESCRIPTION OF THE DRAWINGS

The features and objects of the invention are more fully described in the following specification which sets forth a preferred embodiment of the invention and includes the drawings wherein.

DETAILED DESCRIPTION OF THE PREFERRED EMBODIMENTS

Figure 2:
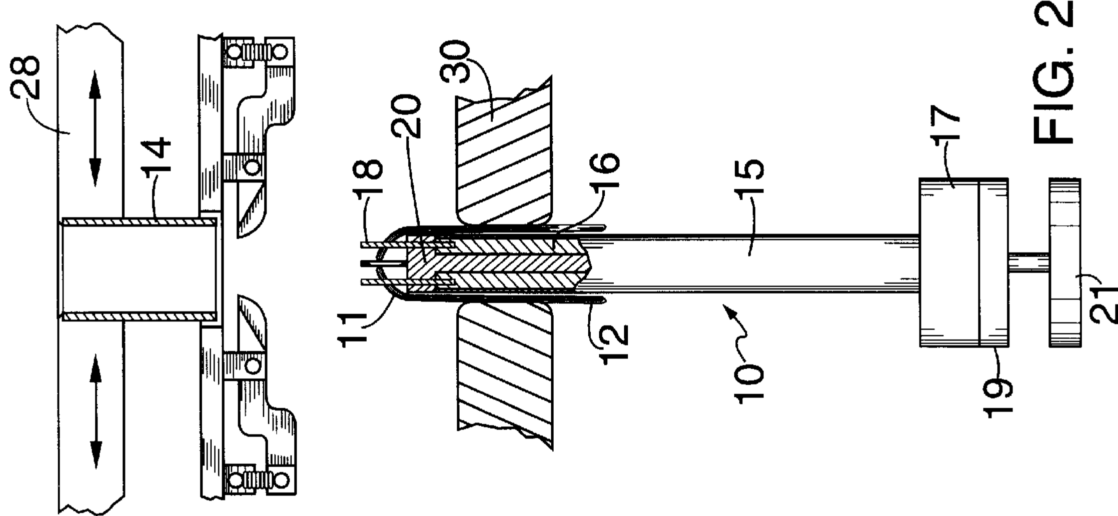
FIGS. 1 to 8 illustrate the transfer tool in crossection and the progressive sequence according to the method steps of the invention.

The transfer tool 10 according to the invention is shown in various stages in FIGS. 1 to 8 transferring prewound coils 12 into cylindrical stator core 14. The transfer tool has a generally telescoping structure such that its operation can be controlled by vertically articulating mounting bases represented by disks 17, 19 and 21. Disks 17 and 21 are connected structurally to a linear actuator such as an air/hydraulic cylinder shaft so as to move in unison. Disk 19 is moved relative to disks 17 and 21 by a secondary linear actuator. The transfer tool mandrel 16 is the main structural member and is in the form of a cylinder secured to disk 19 by means of a facile twist-lock connector. Locating pins 18 defining "slot" boundaries are fastened to mandrel 16 and extend upward from the mandrel riding freely through stripper 20. Stripper 20 is of a diameter equal to the final inside diameter of the finished stator and is attached to a rod running vertically through the center of mandrel 16 to final contact with disk 21. A cylindrical sleeve 15 with an outside diameter equal to the inside diameter of the finished stator slides freely over mandrel 16 and rests on disk 17 when the mandrel assembly is in place. Stripper 20 rests on the top of sleeve 15. Sleeve 15 is preferably a thin wall cylinder with an exterior coating of non-stick material (e.g., polytetraflouroethylene such as Teflon) which facilitates removal of the cylinder after the after the stator winding has been finished and bonded. Sleeve 15 may also be a thin wall insulating material (e.g. epoxy fiberglass) which becomes an integral part of the stator winding once in place.

Figure 1:
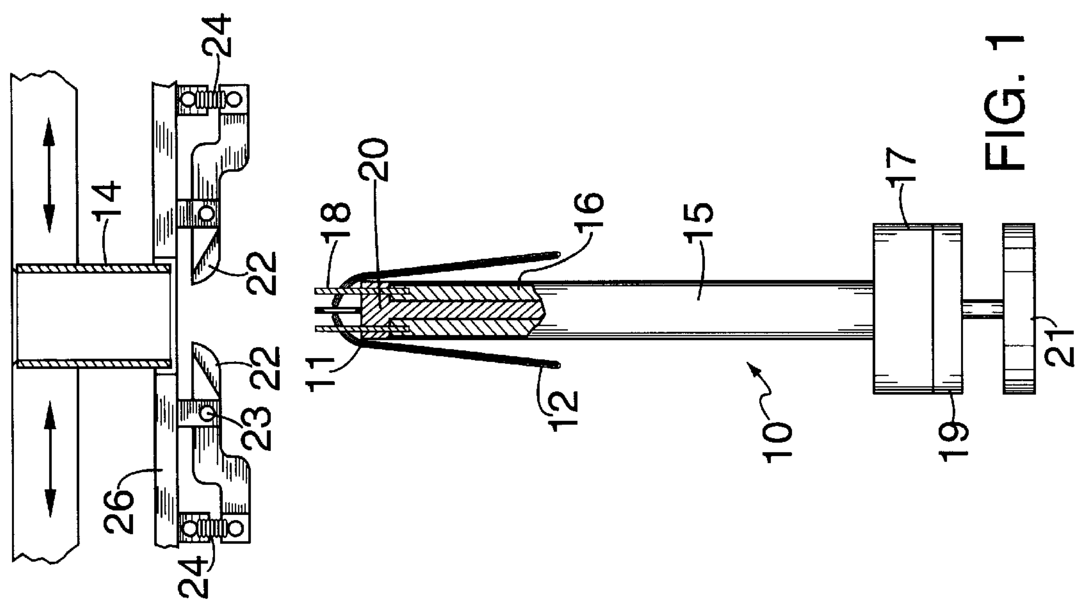

Locating pins 18 (number equal to the number of "slots" defining the winding) are shown extended through the stripper 20 in defining the winding) are shown extended through the stripper 20 in FIG. 1 and the prescribed number of coils of the winding are in place on these pins in their proper relationship to each other.

Stator core 14 is part of the motor being fabricated. The stator core is made of magnetic material preferably laminated iron and provides a magnetic flux return path for the rotor permanent magnets. The stator core is held in position aligned on the axis of the transfer tool by a top plate 28. Coil guides 22 are mounted on a bottom plate 26 which is also centered on the stator core. The coil guides comb the coils while being inserted. The coil guides 22 are pivoted at a pivot 23 and are normally maintained in the position shown in Fig.1 by the springs 24.

In the method according to the invention the coils are first prewound on a conventional winder according to the winding design for the motor being manufactured. The transfer tool 10, with sleeve 15 and stripper 20 in place is used to transfer the coils to the placing apparatus depicted in FIGS. 1 to 8. The number of coil locating pins 18 is equal to the number of "slots" in which the coils will be located. The leading end turn 11 of each coil are looped around a different set of the pins and the coil is drooped down over the sleeve 15 as shown in FIG. 1. The loaded transfer tool is then placed and locked in position on disks 17 and 19. A clamp 30 is then closed to dress the coils inwardly to closely surround sleeve 15 as shown in FIG. 2.

Figure 4:
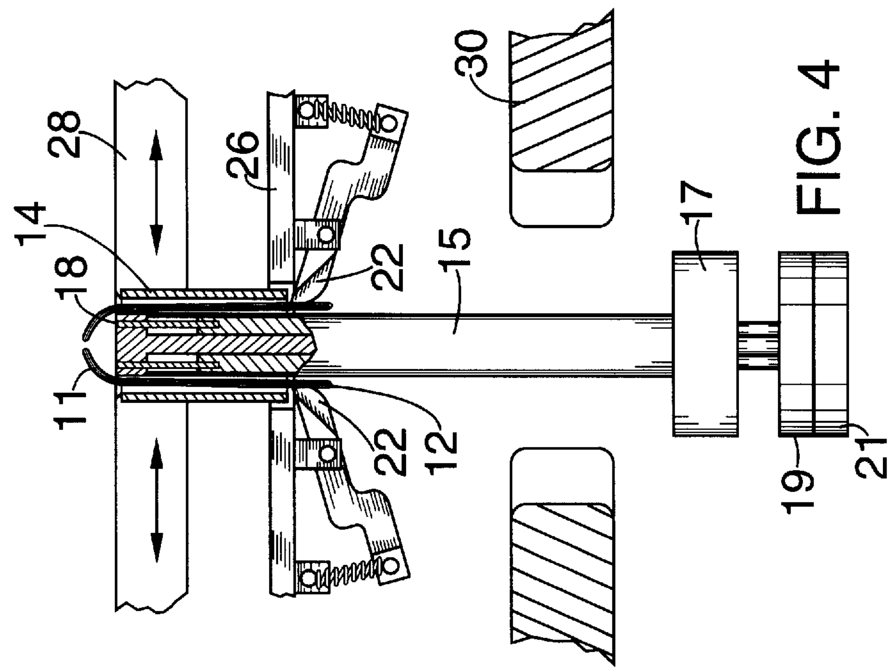
Figure 3:
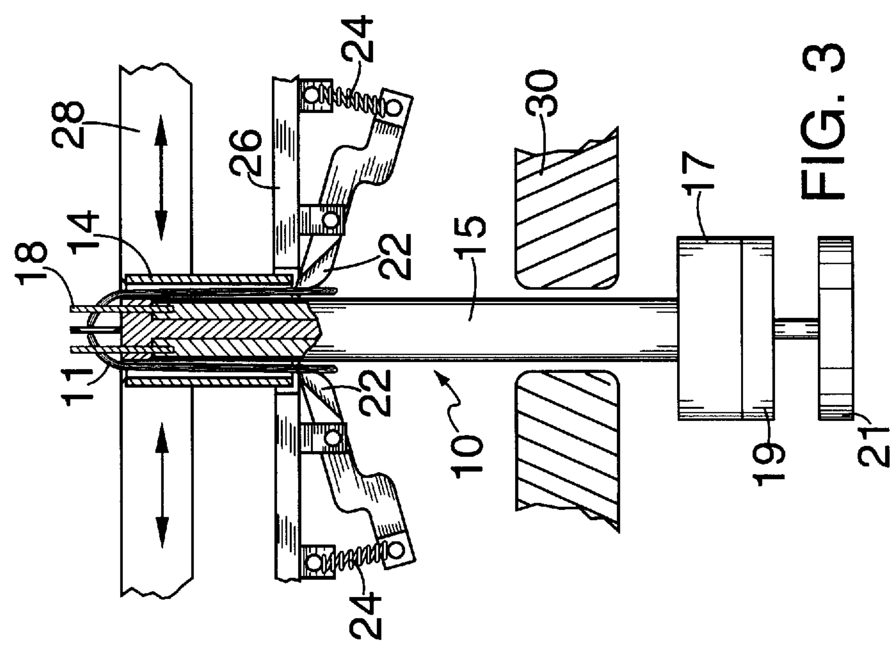
Figure 6:
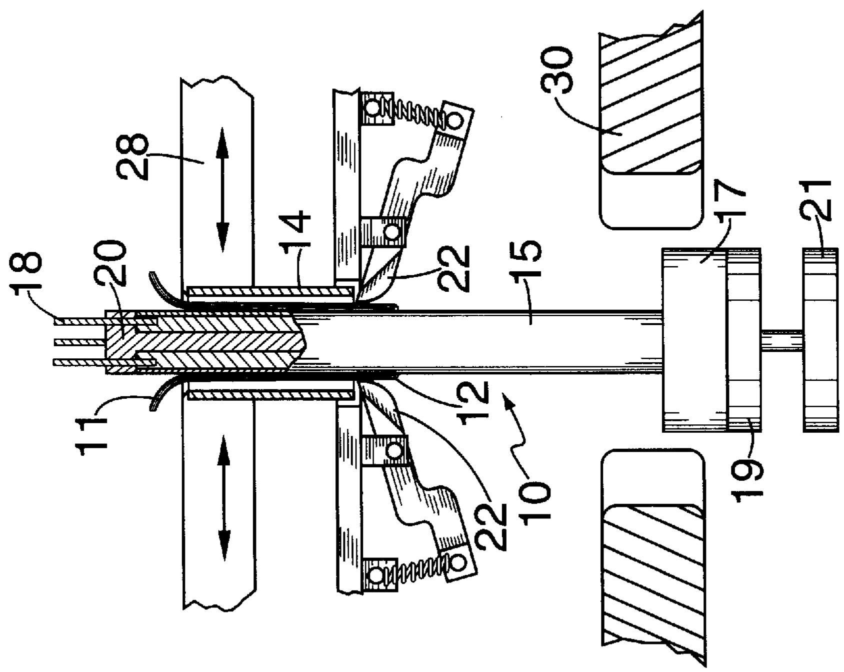
Figure 5:
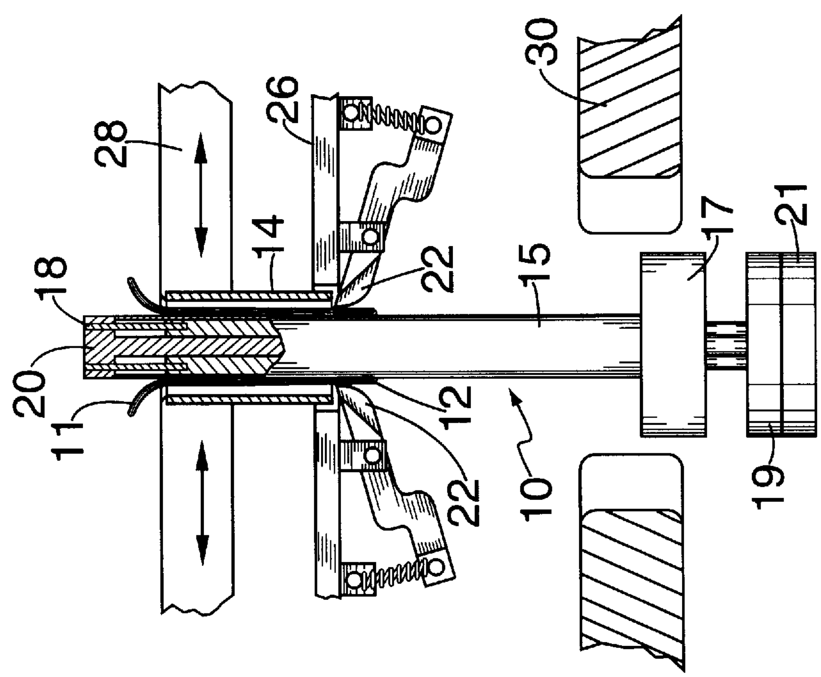

Transfer tool 10 with the coils in place is then pushed upwardly to the position shown in FIG. 3 with the leading end turns 11 of the winding extending above stator core 14. As the transfer tool moves upwardly, slot guides 22 comb the coils so the conductors are straight and parallel to the axis. This combing action places the coils in their respective "slot" positions. Clamp 30 recedes as the transfer tool advances. Next, the locator pins are retracted by lowering control disk 19 so that the leading end turns of the winding are free as shown in FIG. 4. As shown in FIG. 5, stripper 20 then acts as a ram as it is the extended upwardly to force the end turns outwardly and to move the sleeve 15 into its final position. As shown in FIG. 6, the pins are then extended through the stripper where they are free of the coils since disk 19 has been returned to its original position relative to disks 17 and 21.

Figure 7:
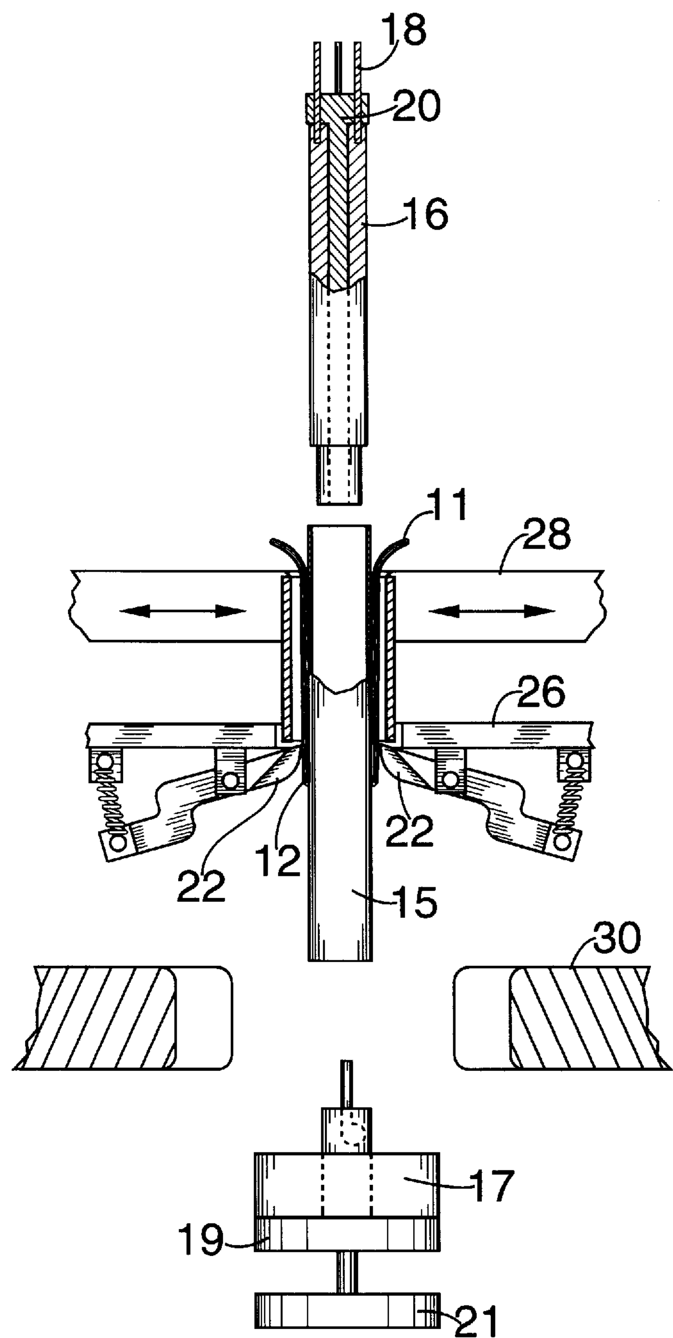
Figure 8:
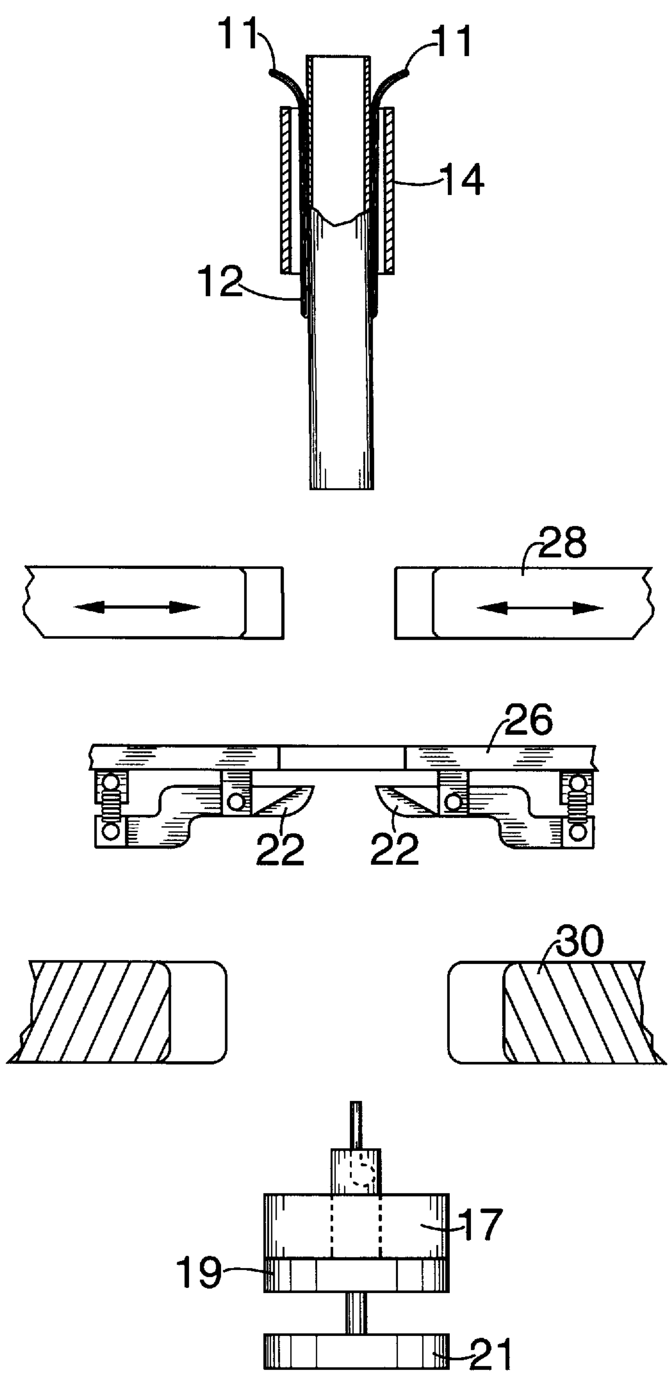

After the winding is in place, the transfer tool is decoupled from the control disks and pulled out of sleeve 15 leaving the sleeve, stator core and winding behind as shown in FIG. 7. Next, the sleeve, winding and stator core are removed as shown in FIG. 8. The finishing operations are thereafter performed and include interconnecting the coils, impregnating the winding with a suitable resin and installing the rotor and motor housing. The linear actuator returns disks 17, 19 and 21 to the start position.

A variation on the foregoing process is to use adhesive coated wire so the coil conductors can be adhesively adhered to adjacent conductors. With this arrangement the coils form a self supporting structure which maintains the proper alignment of the conductors during the transfer process.

As shown in FIGS. 1–8, disks 17 and 21 always move together and, therefore, can be combined and controlled by a single actuator. Disk 19 moves relative to disks 17 and 21 and is therefore controlled by a separate actuator.

Although only the most preferred specific embodiments have been described in detail, it should be obvious that there are many variations and other embodiments within the scope of this invention which is more particularly defined in the appended claims.

I claim:

1. A method of producing a slotless wound stator located within a cylindrical shell of an electric machine, including the steps of:

providing a transfer tool with retractable location pins at one end;

preforming winding coils and locating said coils on said location pins;

moving said transfer tool with said winding coils thereon through said cylindrical stator shell so the end turns of said coils extend outwardly from both ends of said cylindrical shell;

using coil guides for combing said coils while moving through said shell so that portions of said coils within said shell between said end turns are substantially parallel;

retracting said location pins after said coils are located within said stator shell;

causing said end turns at the location pin end of said transfer tool to flair outwardly; and removing said transfer tool.

2. The method according to claim 1 wherein said transfer tool further includes a stripper at one end for removing said coils from said location pins.

3. The method of claim 2 wherein said transfer tool has a telescoping structure such that location pin retraction and stripper extension can be controlled from one end of the transfer tool.

4. The method according to claim 1 wherein said transfer tool is surrounded with a non-stick sleeve, said coils are located outside said sleeve, and said sleeve remains inside said coils and said cylindrical shell when said tool is removed.

5. The method according to claim 4 wherein said sleeve is coated with polytetraflouroethylene.

6. The method according to claim 1 wherein said coils are impregnated with a resin after said tool is removed and before said sleeve is removed.

7. The method according to claim 4 wherein said sleeve is of a thin wall insulating material which becomes an integral part of the stator once in its final position.

8. A slotless electric machine with a wound stator including windings located in the air gap comprising a cylindrical permanent magnet rotor;

a cylindrical stator shell made of magnetic material;

preformed winding coils located in the air gap between said rotor and said stator shell, said winding coils being preformed on location pins extending from a transfer tool so that said preformed winding coils can be pulled through said cylindrical shell to a position where end turns extend from both ends of said cylindrical shell, and so that said location pins are thereafter retracted to enable removal of the transfer tool;

said end turns at at least one end being flared outwardly for insertion of said cylindrical rotor therein; and said winding coils being impregnated with resin to secure said winding coils to said cylindrical shell.

9. A slotless stator electric machine with a wound stator according to claim 8 wherein said transfer tool is surrounded by a non-stick sleeve and wherein said non-stick sleeve remains inside said winding coils after said transfer tool is removed.

* * * * *